United States Patent
Yamasue et al.

(10) Patent No.: US 6,658,366 B2
(45) Date of Patent: Dec. 2, 2003

(54) SPEED SENSOR

(75) Inventors: Toshinori Yamasue, Kyoto (JP); Teruhisa Ishihara, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/106,882

(22) Filed: Mar. 22, 2002

(65) Prior Publication Data
US 2002/0161546 A1 Oct. 31, 2002

(30) Foreign Application Priority Data
Mar. 23, 2001 (JP) .................................. 2001-085115

(51) Int. Cl.[7] .............................. G01P 3/00; G06F 15/00
(52) U.S. Cl. ........................ 702/145; 73/714; 340/444; 701/40; 701/90
(58) Field of Search ................. 702/127, 142, 702/145; 340/442, 444; 701/40, 42, 90; 73/714, 861.73

(56) References Cited

U.S. PATENT DOCUMENTS 4,484,280 A * 11/1984 Brugger et al. ................ 701/90
5,229,955 A * 7/1993 Nishiwaki et al. ............ 701/40
6,504,475 B2 * 1/2003 Sugisawa ..................... 340/444
6,505,515 B1 * 1/2003 Delaporte ...................... 73/714

FOREIGN PATENT DOCUMENTS

JP  2001-060379  *  3/2001

* cited by examiner

Primary Examiner—John Barlow
Assistant Examiner—John Le
(74) Attorney, Agent, or Firm—Beyer Weaver & Thomas LLP

(57) ABSTRACT

A speed sensor has a stationary electrode and a mobile electrode held normally at a specified distance from each other by an elastic supporting device. The speed sensor is attached to one of the wheels of a vehicle such as an automobile. The centrifugal force due to the rotation of the wheel is measured from the displacement of the mobile electrode with respect to the stationary electrode, and the traveling speed of the vehicle is calculated from the measured centrifugal force.

8 Claims, 8 Drawing Sheets

SPEED SENSOR

BACKGROUND OF THE INVENTION

This invention relates to a speed sensor, and more particularly to an electrostatic speed sensor for detecting, for example, the speed of a vehicle such as an automobile traveling on rotating wheels, the detection being based on the centrifugal force caused by the rotation of one of its wheels.

It has been known to electrostatically detect the speed of an automobile from the centrifugal force caused by the rotation of its tire. Japanese Patent Publication Tokkai 1996-240609, for example, disclosed such a speed sensor, characterized as having a weight attached to the back surface of a mobile electrode because changes in the acceleration as the running speed of the automobile is changed are not sufficient for displacing the mobile electrode of the sensor. A speed sensor of this type is not convenient, however, because the attachment of a weight onto the mobile electrode means an extra component to assemble and an extra work process in its manufacture and also because the finished product has a more complicated structure and the sensor cannot be made compact. In other words, such a prior art speed sensor cannot be easily attached to the tire of an automobile for detecting its speed by means of the centrifugal force thereon.

SUMMARY OF THE INVENTION

It is therefore an object of this invention to provide a structurally simple and compact speed sensor which comprises a reduced number of constituent parts and can be assembled with a reduced number of steps.

A speed sensor embodying this invention, with which the above and other objects can be accomplished, may be characterized as having a mobile electrode opposite a stationary electrode at a specified distance therebetween and displacing this mobile electrode by a centrifugal force to detect the speed. With a speed sensor thus characterized, there is no need to affix a weight, unlike the prior art technology described above, since the displacement of the mobile electrode is caused by a centrifugal force. As a result, the number of constituent parts and the number of steps required for the assembly process can be reduced, and the sensor as a whole is simpler in structure and can be made compact.

The mobile electrode may be supported by one or more hinge springs extending inward from a ring-shaped support structure. With the mobile electrode, the support structure and the hinge springs integrated, a compact speed sensor can be provided with a reduced number of components, and such a speed sensor can be easily assembled. Alternatively, the stationary electrode may be provided with a protrusion which penetrates an opening formed through the mobile electrode. With such a structure, even if a large external impulsive force is applied, the protrusion can support the mobile electrode and prevent any plastic deformation of the hinge springs. Such a protrusion may be formed to serve as a terminal for the stationary electrode so that the overall structure of the sensor can be simplified.

A spacer may be provided between the stationary and mobile electrodes such that they can face each other at a specified distance. This structure is advantageous in that the mechanical precision of the structure is improved, and sensors can be obtained with reduced variations in their operating characteristics.

BRIEF DESCRIPTION OF THE DRAWINGS

Throughout herein, like components are indicated by the same numerals and may not necessarily be explained repetitiously. The circuit for measuring electrostatic capacitance is omitted for the simplicity of disclosure.

DETAILED DESCRIPTION OF THE INVENTION

Figure 1:
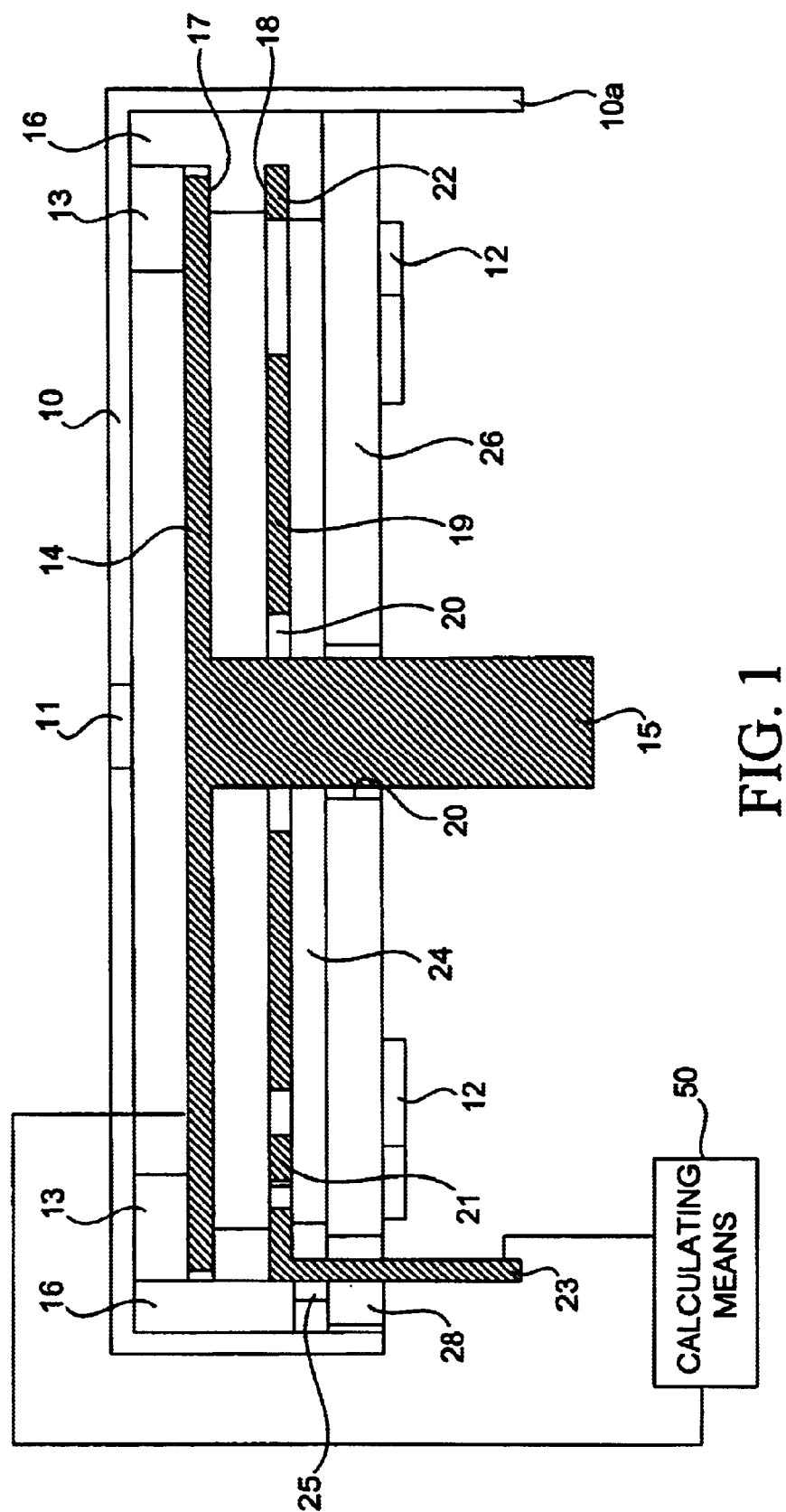
FIG. 1 is a sectional view of a speed sensor according to a first embodiment of this invention with a calculating means shown schematically.
Figure 2:
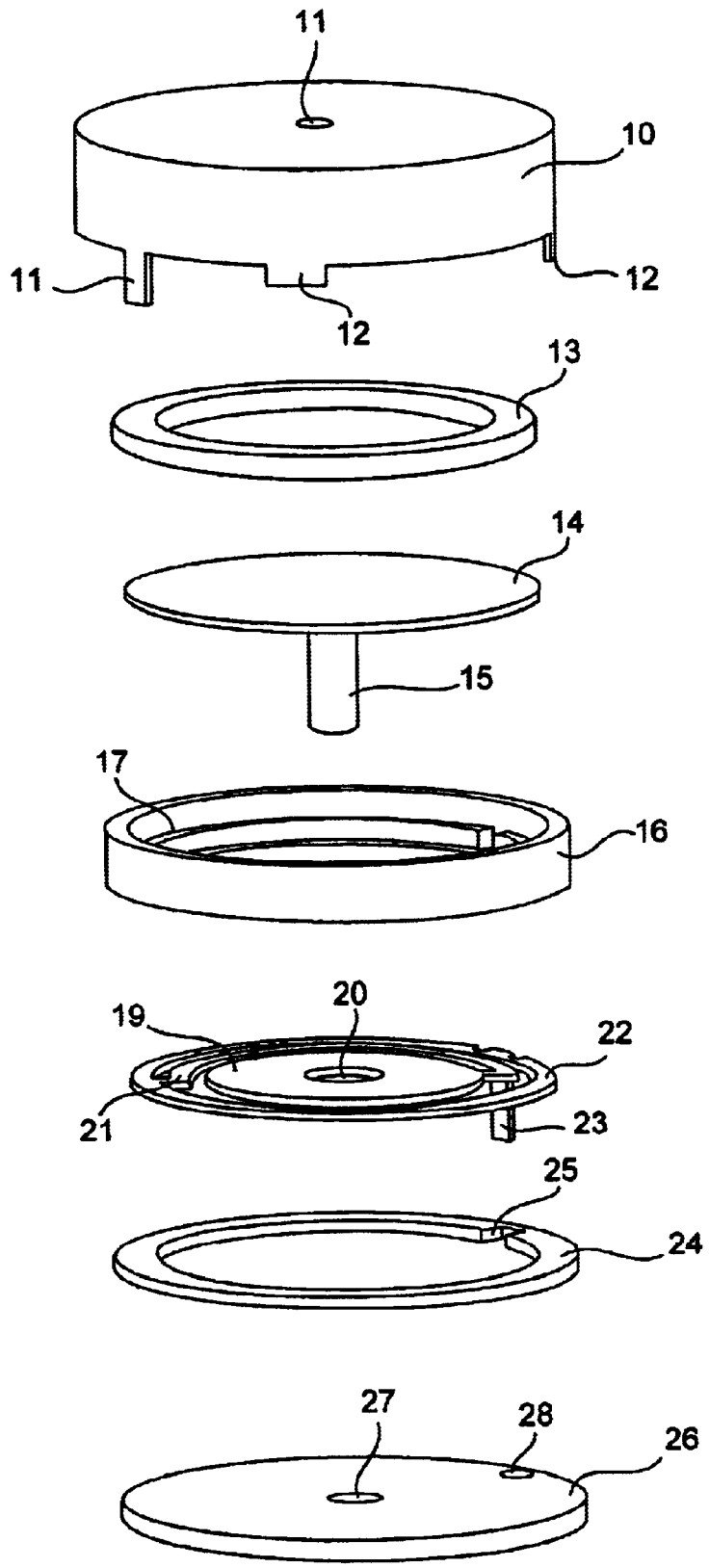
FIG. 2 is an exploded diagonal view of the speed sensor of FIG. 1.

The invention is described next by way of examples. FIGS. 1 and 2 show a speed sensor according to a first embodiment of this invention, having a stationary electrode 14 and a mobile electrode 19 disposed inside a housing comprised of a shield cover 10 and a base lid 26 and having rubber rings 13 and 24 and a spacer 16 so as to be kept opposite each other and at a specified distance of separation.

The shield cover 10 is cross-sectionally U-shaped, or shaped like a cup for containing therein the inner components, to be described more in detail below, and a ventilating opening 11 is provided at the center of its bottom portion. Protruding from the open edge of the side wall portion of the shield cover 10 are a shield terminal 10a and a plurality of bendable engagement pieces 12. The main body of the shield cover 10 may be 16 mm in diameter, and its side wall portion may be 3 mm in height.

The stationary electrode 14 is set inside the shield cover 10 through the rubber ring 13 and is approximately T-shaped cross-sectionally, having a shaft 15 extending downward from the center of its lower surface to serve as a terminal. The spacer 16, which serves to position the rubber ring 13 and the stationary electrode 14, has its outer circumference shaped so as to conform with the inner surface of the shield cover 10. It has an annular step 17 for engagingly holding the rubber ring 13 and the stationary electrode 14 inside and another annular step 18 for engagingly holding the mobile electrode 19. These annular steps 16 and 17 are on mutually opposite surfaces of the spacer 16.

The mobile electrode 19 is planar and provided with an opening 20 at its center, as can be seen more clearly in FIG. 2. It is supported by a ring-shaped supporting structure (supporter ring 22) by way of a hinge spring 21 which is approximately C-shaped, extending inward from the periphery of the supporter ring 22. The supporter ring 22 has an outer diameter such that it can be engageable with the annular step 18 of the spacer 16. A terminal 23 for the mobile electrode 19 extends downward from the supporter ring 22.

The outer diameter of the rubber ring 24 is such that it can engagingly fit inside the inner peripheral surface of the shield cover 10. Its inner peripheral surface is provided with a cut 25 for allowing the terminal 23 to pass through.

The base lid 26 is a circular disk, adapted to engage with the open edge part of the shield cover 10 to sealingly close it. It is provided with an opening 27 for passing the shaft 15 of the stationary electrode 14 and another opening 28 for the terminal 23 for the mobile electrode 19.

Numeral 50 schematically indicates a calculating means for measuring the change in the separation between the stationary and mobile electrodes 14 and 19. Although not separately shown, the speed sensor is adapted to be attached to a tire of an automobile. From the known dimension of the tire and the position of the sensor with respect to the tire on which it is attached, the speed of the automobile can be calculated from the rotational speed of the tire, and the rotational speed of the tire can be calculated in a known manner from the centrifugal force on the speed sensor, or on the mobile electrode 19.

For assembling the sensor, the stationary electrode 14 is placed on the rubber ring 13 positioned on the ceiling surface of the shield cover 10. Next, the spacer 16 is inserted into the shield cover 10, and the rubber ring 13 and the stationary electrode 14 are properly positioned by engaging them with the annular step 17 of the spacer 16. After the supporter ring 22 of the mobile electrode 19 is engaged with the annular step 16 of the spacer 16, the rubber ring 24 is assembled. The shaft 15 and the terminal 23 are passed through the openings 27 and 28 of the base lid 26, and the bendable engagement pieces 12 are bent after the base lid 26 is engaged with the shield cover 10.

The method of using the speed sensor thus assembled will be explained next when it is attached to the wheel of an automobile tire.

When the automobile is resting stationary, the mobile electrode 19 is not subjected to any centrifugal force and hence is at its normal position opposite the stationary electrode 14, separated therefrom by a specified distance. As the automobile starts to run and the tire begins to rotate, a centrifugal force operates on the mobile electrode 19, causing it to move towards the stationary electrode 14 and increasing the electrostatic capacitance therebetween. An increase in the speed of the automobile can be thereby detected by the calculating means 50.

As the automobile is decelerated, the centrifugal force on the mobile electrode 19 becomes weaker. As the mobile electrode 19 moves away from the stationary electrode 14, the electrostatic capacitance therebetween becomes lower, and the deceleration of the automobile is thereby detected similarly.

Figure 3:
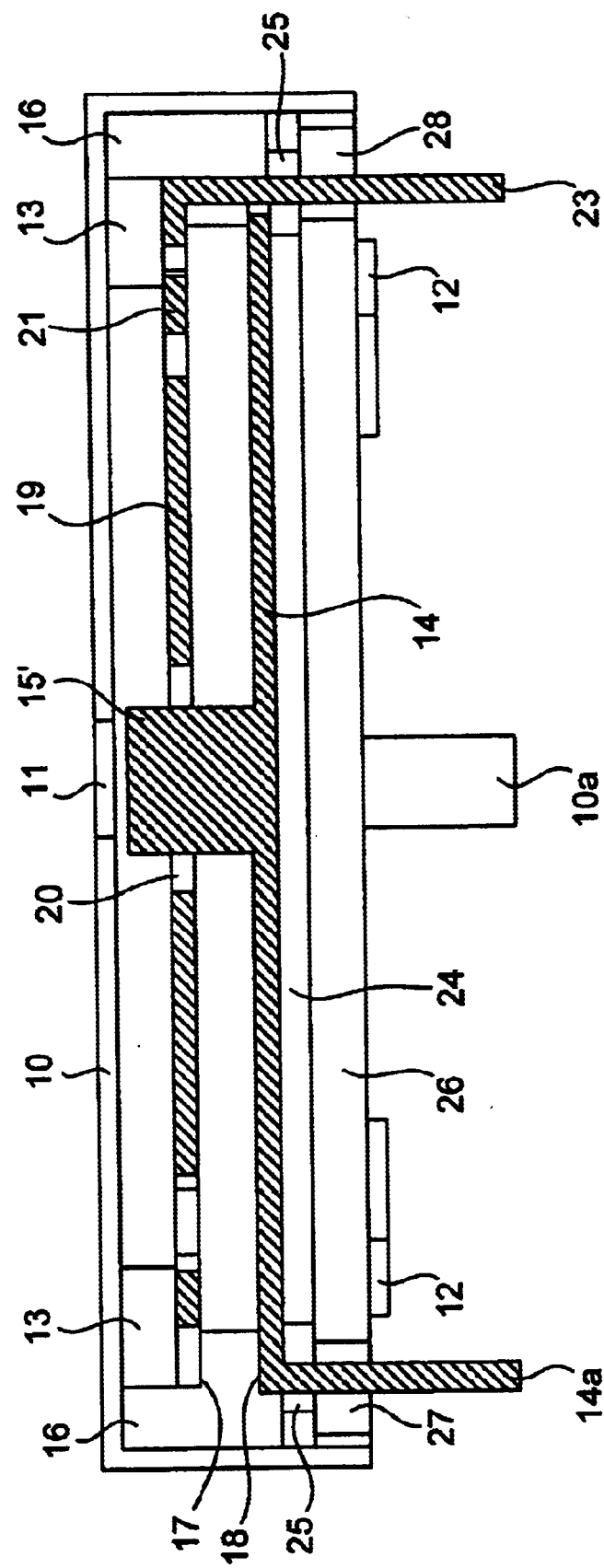
FIG. 3 is a sectional view of a portion of a speed sensor according to a second embodiment of this invention.
Figure 4:
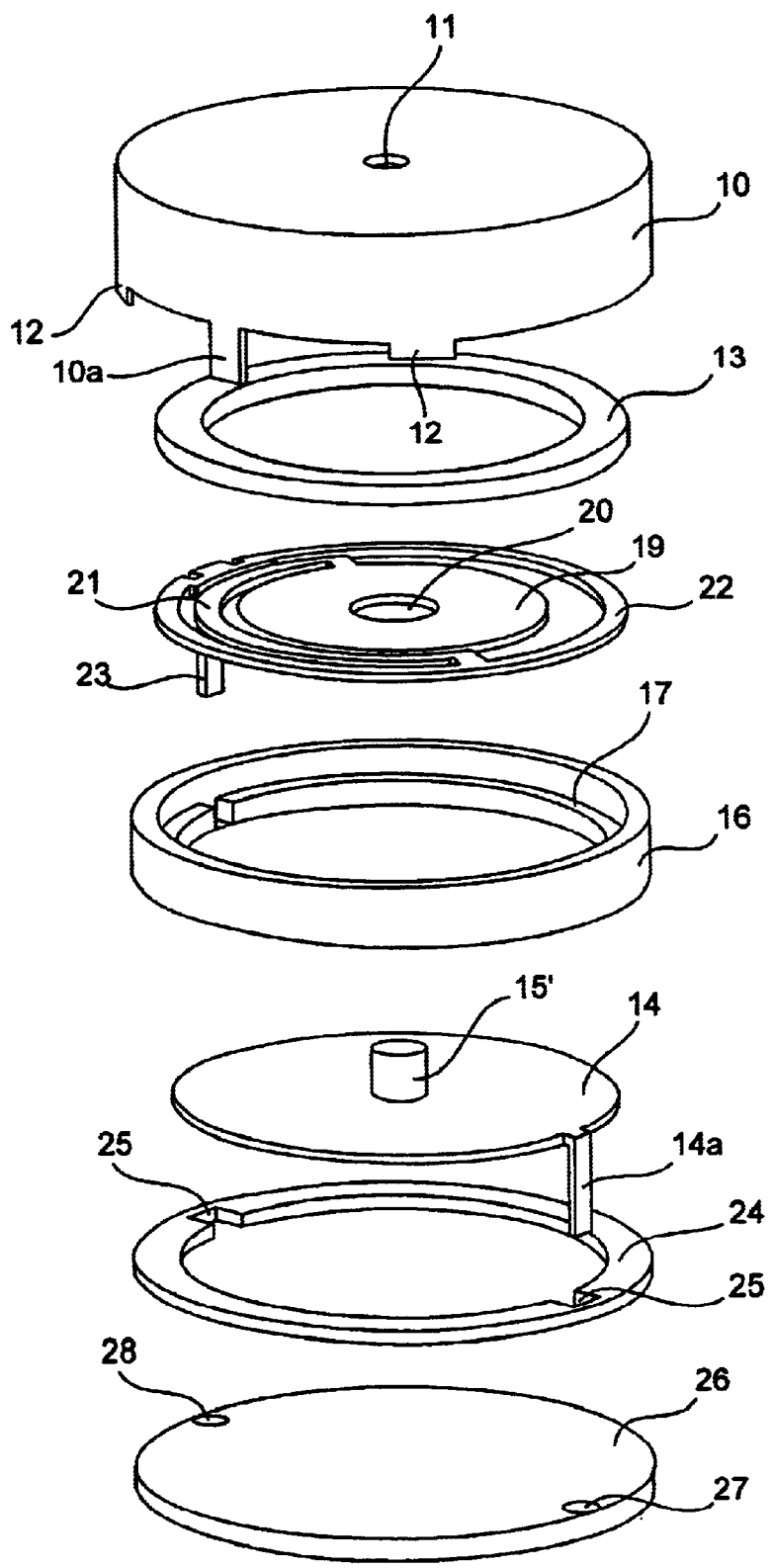
FIG. 4 is an exploded diagonal view of the speed sensor of FIG. 3.

FIGS. 3 and 4 show another speed sensor according to a second embodiment of the invention. For the convenience of disclosure, the calculating means 50 is not shown in these figures. It is similar to the speed sensor according to the first embodiment of the invention described above with reference to FIGS. 1 and 2 but is different in that the positional relationship between the mobile electrode 19 and the stationary electrode 14 is reversed. Thus, the stationary electrode 14 has a terminal 14a extending downward from its outer periphery, the rubber ring 24 has two cuts 25 on its inner periphery, and the opening 27 for the terminal for the stationary electrode 14 is provided near the periphery of the base lid 26.

The mobile electrode 19 has an opening 20 at its center. The stationary electrode 14 has a protrusion 15' at the center which penetrates the opening 20 through the mobile electrode 19 towards the ventilating opening 11 through the shield cover so as to be serviceable as a terminal.

In other aspects, the speed sensors according to the first and second embodiments are substantially the same, and hence such aspects will not be described repetitiously.

This invention relates also to speed sensors of the type adapted to measure also the inner pressure of a sealed container such as the air pressure inside an automobile tire and to detect the speed by measuring the centrifugal force thereon. Such a sensor may be hereinafter sometimes referred to as a pressure-speed sensor for the sake of clarity in description.

Figure 5:
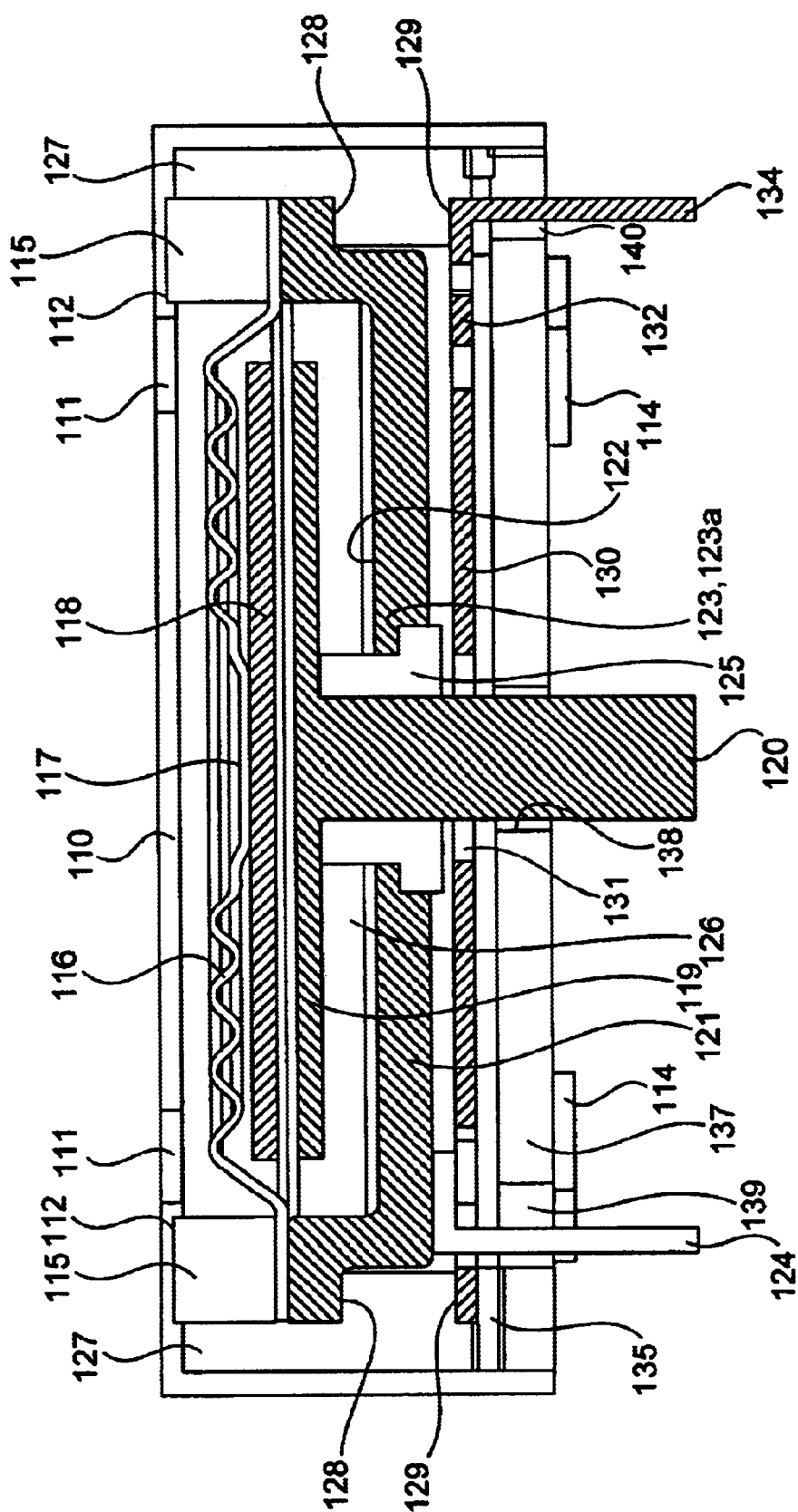
FIG. 5 is a sectional view of a portion of a speed sensor according to a third embodiment of this invention.
Figure 6:
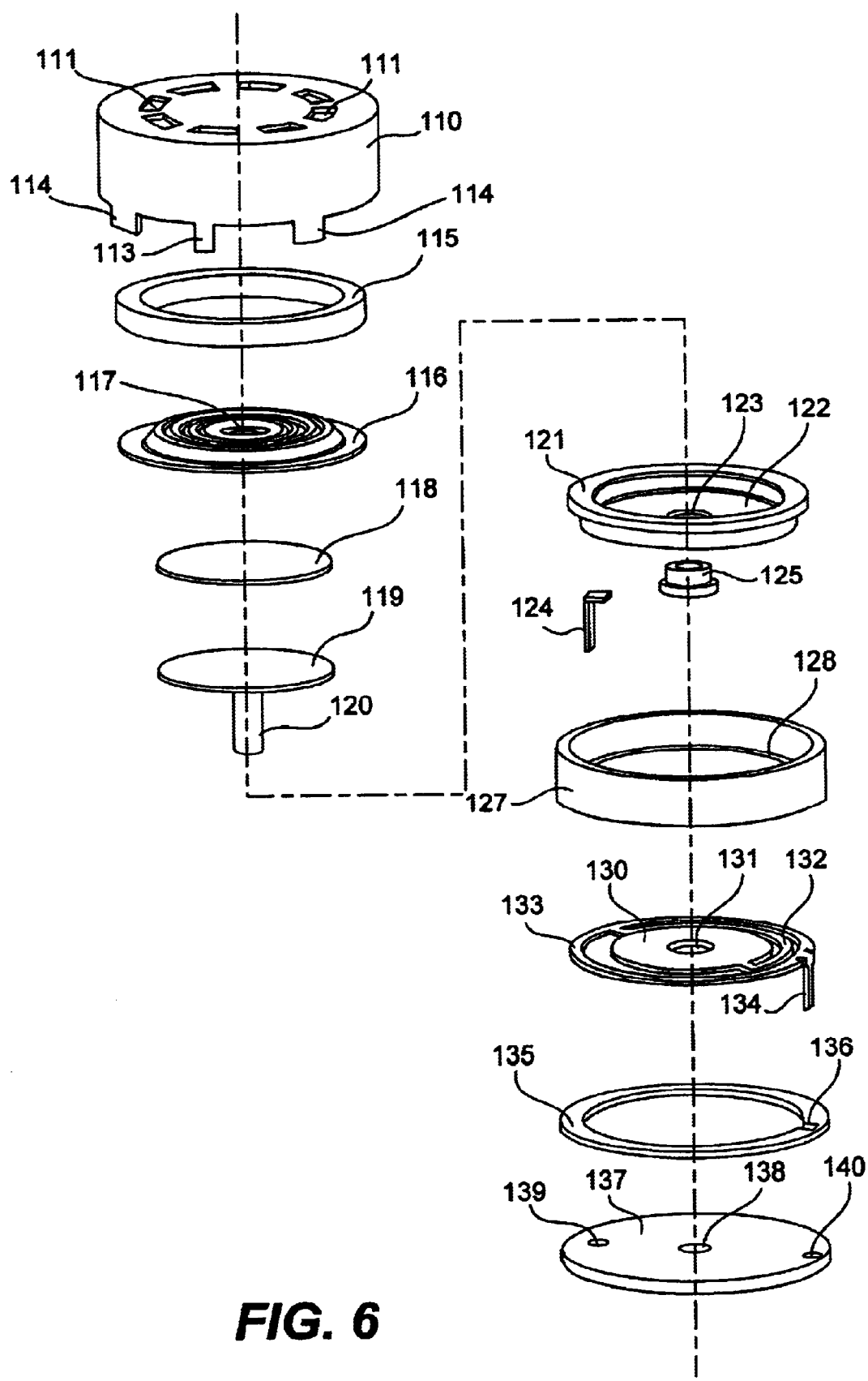
FIG. 6 is an exploded diagonal view of the speed sensor of FIG. 5.

FIGS. 5 and 6 show such a pressure-speed sensor embodying this invention (or a speed sensor according to a third embodiment of this invention). Disposed inside a housing comprised of a shield cover 110 and a base lid 137, there are a first mobile electrode 118, a first stationary electrode 119, a second mobile electrode 130 and a base member 121 serving as a second stationary electrode. The first stationary and mobile electrodes 118 and 119 are opposite each other, being separated from each other by a specified distance, and together form a pressure sensor. The second mobile electrode 130 and the base member 121 serving as the second stationary electrode are opposite each other, being separated from each other by another specified distance, and together form a speed sensor.

The shield cover 110 is cross-sectionally U-shaped, or shaped like a cup for containing therein the inner components, to be described more in detail below, having a plurality of discontinuous ventilating openings 111 formed on its ceiling surface in an annular formation. A shallow annular groove 112 is formed on the lower surface of this ceiling surface such that a sectionally square-shaped rubber ring 115 can be engagingly inserted therein. It is also provided with a shield terminal 113 (shown in FIG. 4) and a plurality of bendable engagement pieces 114 protruding from its open edge part.

The first mobile electrode 118 and the first stationary electrode 119 are disposed inside a standard-pressure chamber 126 by integrally forming a peripheral edge part of a diaphragm 116 with an annular edge part of the base member 121. This diaphragm 116 has an upwardly swelling form, having a center part 117 with a flat surface which is surrounded by concentrically formed protrusions and indentations. The size of the center part 117 may be varied if necessary. The mobile electrode 118 is directly in contact with the bottom surface of this center part 117.

The first stationary electrode 119 is approximately T-shaped cross-sectionally, having a shaft 120 extending downward from the center of its lower surface.

The base member 121 serving as the second stationary electrode comprises a generally hat-shaped metal piece, having a throughhole 123 formed at the center of its bottom part 122 for passing the shaft 120 of the first stationary electrode 119 therethrough. A fixed electrode terminal 124 is welded integrally to the outer bottom surface of the bottom part 122 of the base member 121.

After the shaft 120 of the first stationary electrode 119 is inserted into the throughhole 123 of the base member 121 through a bearing 125 made of a glass material, a sealer is poured in and solidified such that the first stationary electrode 119 is supported by the base member 121 and in a face-to-face relationship with the base member 121 with a specified distance therebetween. As the peripheral edge part of the diaphragm 116 is integrally welded to the open edge part of the base member 121, the first mobile and stationary electrodes 118 and 119 face each other with another specified distance therebetween.

As shown in FIG. 5, the throughhole 123 is provided with an annular step 123a for engaging the bearing 125 of a glass material having a flange. This serves to prevent the sealing material, when it is poured in, from flowing in excessively and also to reduce the initial floating capacitance by separating the shaft 120 as much as possible from the base member 121. For this purpose, the portion of the base member 121 adjacent to the shaft 20 of the first stationary electrode 119 is made thinner.

Numeral 127 indicates a spacer having its outer periphery shaped so as to be engageable with the inner peripheral surface of the shield cover 110. Its inner peripheral surface is provided with an annular step 128 for properly positioning the base member 121 by engaging therewith and another annular step 129 for properly position the second mobile electrode 130 by engaging therewith.

As shown in FIG. 6, the second mobile electrode 130 has a throughhole 131 at its center part and is supported by a supporter ring 133 by way of a hinge spring 132 which is approximately C-shaped, extending inward from the periphery of the supporter ring 133. The supporter ring 133 has an outer diameter so as to be engageable with the annular step 129 of the spacer 128. A terminal 134 for the mobile electrode extends downward from the supporter ring 133.

Numeral 135 indicates a rubber ring for elastically supporting the supporter ring 33 from its backside. This rubber ring 135 has an outer diameter so as to be engageable with the inner peripheral surface of the shield cover 110 and is provided with a cut 136 on its inner peripheral surface for passing the terminal 134 therethrough.

The base lid 137 is a circular disk, adapted to engage with the open edge part of the shield cover 110 to sealingly close it. It is provided with an opening 138 for the first stationary electrode and openings 139 and 140 for the mobile electrode.

For assembling this sensor, the first stationary electrode 119 and the base member 121 to become the second stationary electrode are integrated first through the bearing 125. Next, the peripheral part of the diaphragm 116, to which the mobile electrode 118 is integrated, is welded to and integrated with the open edge part of the base member 121. The base member 121 thus integrated is placed on the rubber ring 15 positioned in the shallow groove 112 of the shield cover 110. Next, the spacer 127 is inserted into the shield cover 110 and positioned by engaging the base member 121 with the annular step 128 of the spacer 127. After the supporter ring 133 for the second mobile electrode 130 is positioned by engaging with the annular step 129 of the spacer 127, the rubber ring 135 is inserted into the shield cover 110. Thereafter, the shaft 120 of the first stationary electrode 119, the terminal 124 for the second stationary electrode and the terminal 134 for the second mobile electrode are inserted respectively through the openings 138, 139 and 140. After they are thus assembled, the engagement pieces 114 of the shield cover 110 are bent to engage the bottom lid 137.

Operations of this sensor as a pressure sensor will be explained next for a situation where the sensor is mounted to the wheel of an automobile tire for measuring the inner pressure of the sealed tire.

When the internal pressure of the standard-pressure chamber 126 is balanced with the external pressure, the first mobile electrode 118 remains facing the first stationary electrode 119 with the specified distance therebetween. If the external pressure drops, the diaphragm 116 expands, and the mobile electrode 118 moves away from the stationary electrode 119. As a result, the electrostatic capacitance therebetween is reduced and the lowered external pressure is thereby detected. If the external pressure is increased, on the other hand, the diaphragm 116 is pushed in, and the mobile electrode 118 approaches the stationary electrode 119, thereby increasing the electrostatic capacitance therebetween. The increase in the external pressure is thereby detected.

Operation of the same sensor as a speed sensor will be explained next.

While the automobile remains stationary, there is no centrifugal force operating on the second mobile electrode 130 and hence it faces the outer bottom surface of the base member 121 serving as the second stationary electrode at the specified distance. When the automobile is started and its tires begin to rotate, the second mobile electrode 130 is subjected to a centrifugal force and approaches the outer bottom surface of the base member 121, thereby increasing the electrostatic capacitance. An increase in the speed of the automobile is thereby detected. As the automobile slows down, the centrifugal force on the second mobile electrode becomes weaker. The second mobile electrode moves away from the base member 121, and the deceleration of the automobile is thereby detected.

Figure 7:
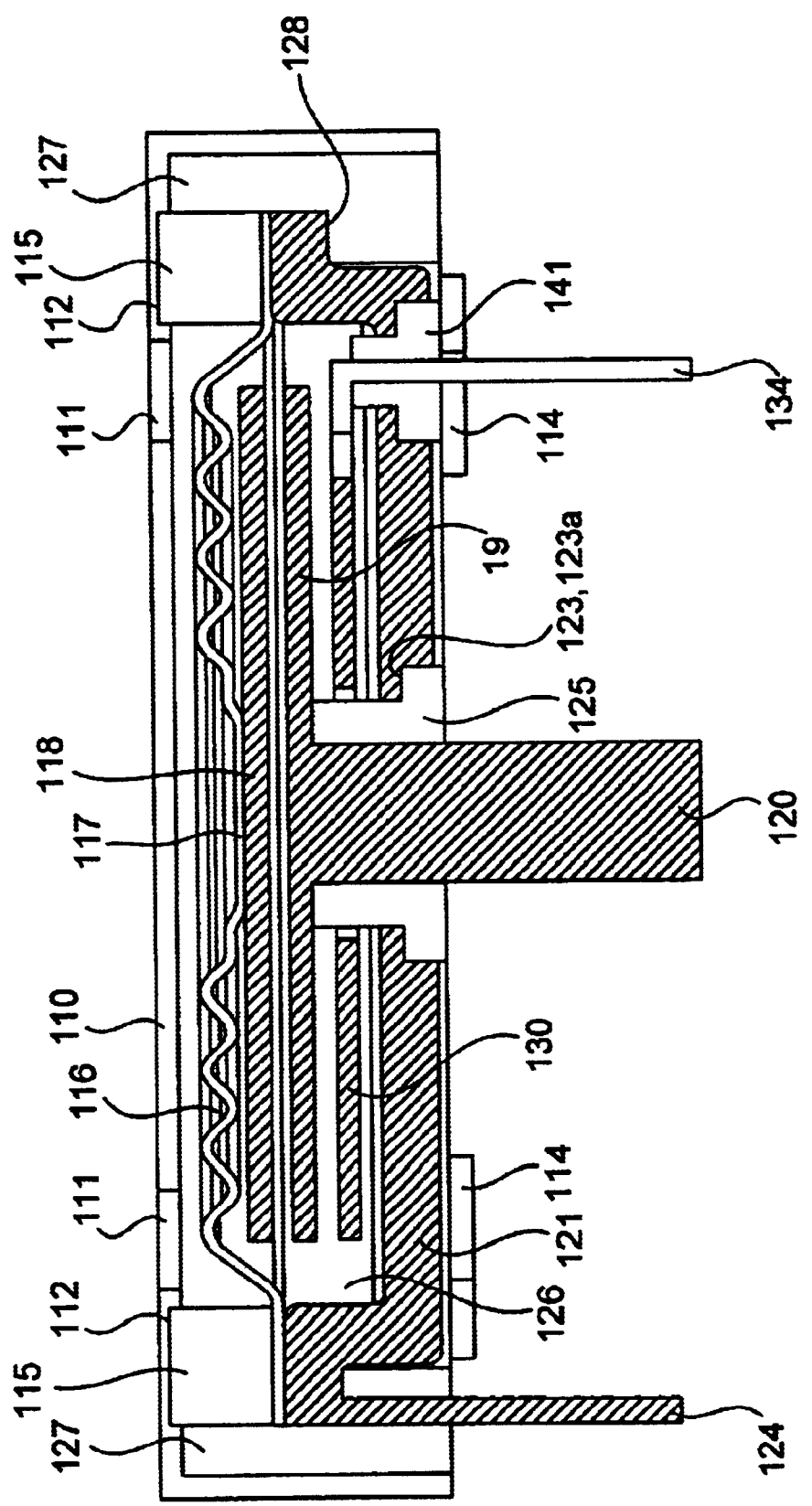
FIG. 7 is a sectional view of a portion of a speed sensor according to a fourth embodiment of this invention.
Figure 8:
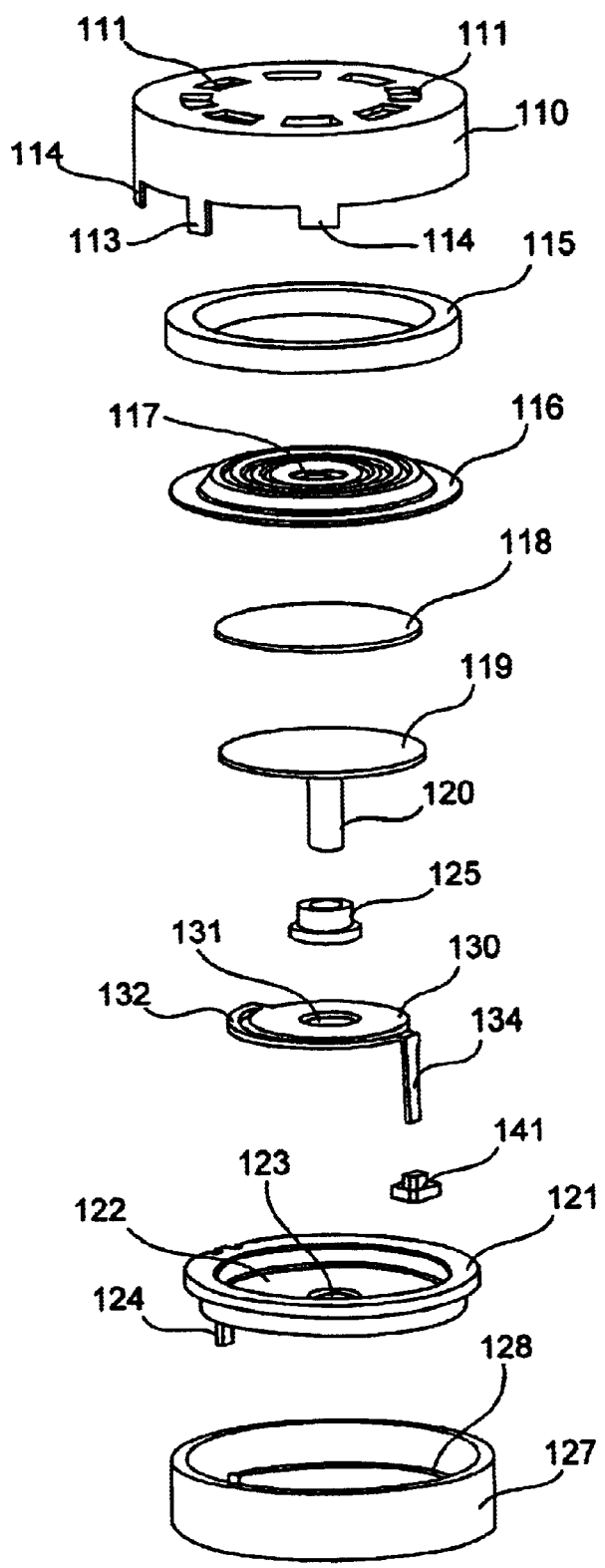
FIG. 8 is an exploded diagonal view of the speed sensor of FIG. 7.

FIGS. 7 and 8 show another pressure-speed sensor embodying this invention (or a speed sensor according to a fourth embodiment of this invention). It is similar to the pressure-speed sensor described above with reference to FIGS. 5 and 6 but is different in that the second mobile electrode 130 is disposed inside the standard-pressure chamber 126 and hence faces the inner bottom surface of the base member 121 with a specified distance therebetween. For this reason, the terminal 134 of its second mobile electrode 130 is made to penetrate the bottom 122 of the base material 121 serving as the second stationary electrode through another bearing 141 with a flange and made of a glass material. The terminal 124 for the base material 121 is integrally formed by pressing. The first stationary electrode 119 and the second mobile electrode 130 are disposed separate from each other such that they do not affect each other.

In other aspects, speed sensors according to the third and fourth embodiments of this invention are substantially the same and hence such aspects will not be described repetitiously. It may be noted, however, that the fourth embodiment is advantageous in that the second mobile electrode 130, being disposed inside the standard-pressure chamber, is free from the effects of dust or the like and hence malfunctions are not likely to occur. Since the base member 121 is used to function also as the bottom lid, furthermore, the number of constituent parts and the number of production steps can be both reduced and hence the sensor can be made even more compact.

Many modifications and variations are possible within the scope of this invention. For example, the diaphragm 116 may have its center part 117 function as a mobile electrode. In such an application, the area of this center part 117 may be appropriately enlarged, or a plating process may be effected on the bottom surface of the diaphragm 116 to increase the electrostatic capacitance. Such a modification is advantageous in that the mobile electrode 118 shown in FIGS. 5–8 can be dispensed with and hence that the productivity can be further improved. Since the diaphragm 116 becomes lighter and freer to move, the response characteristic of the sensor also improves.

Although not separately shown, the glass bearing 125 shown in FIGS. 5 and 6 may be replaced by another disposed on the bottom 122 of the base member 121 so as to be sandwiched between the first stationary electrode 119 and the bottom 122 of the base member 121. This variation is advantageous in that the first stationary electrode 119, being supported from the backside, is less likely to be deformed. In other words, the sensor becomes less likely to be affected by the external vibrations and impulses and hence more reliable.

The diaphragms 116 need not necessarily be designed as shown in FIGS. 5–8 with concentric protrusions and indentations. A terminal may be extended from the diaphragm 116 for a direct connection with an external circuit.

The standard-pressure chamber 126 may be filled with a liquid such as a silicon oil. Since a liquid is generally less sensitively affected by a temperature change, it is advantageous in that the sensor becomes even more reliable in view of changes in temperature.

The embodiments of the invention described above with reference to FIGS. 5–8 are a combination of a speed sensor and a pressure sensor. Since many of the constituent parts can be shared commonly between the two sensors, the total number of constituent parts and the number of steps in the production and assembly can be reduced and the sensor as a whole can be made compact.

What is claimed is:

1. A speed sensor comprising:
    a stationary electrode;
    a mobile electrode;
    elastic supporting means for elastically supporting said mobile electrode normally at a specified distance from said stationary electrode; and
    calculating means for measuring a centrifugal force on said mobile electrode from a displacement of said mobile electrode with respect to said stationary electrode and calculating a speed of a vehicle from said measured centrifugal force, said vehicle traveling on rotating wheels, said speed sensor being attached to one of said wheels to rotate therewith such that said centrifugal force is imparted on said mobile electrode.

2. The speed sensor of claim 1 wherein said elastic supporting means includes a ring-shaped supporting structure and at least one hinge spring extending inward from said supporting structure, said mobile electrode being supported by said supporting structure by means of said at least one hinge spring.

3. The speed sensor of claim 2 wherein said mobile electrode has an opening therethrough and said stationary electrode has a protrusion protruding therefrom, said protrusion penetrating said opening through said mobile electrode.

4. The speed sensor of claim 3 further comprising a spacer disposed between said stationary electrode and said mobile electrode for normally maintaining said specified distance therebetween.

5. The speed sensor of claim 2 further comprising a spacer disposed between said stationary electrode and said mobile electrode for normally maintaining said specified distance therebetween.

6. The speed sensor of claim 1 wherein said mobile electrode has an opening therethrough and said stationary electrode has a protrusion protruding therefrom, said protrusion penetrating said opening through said mobile electrode.

7. The speed sensor of claim 6 further comprising a spacer disposed between said stationary electrode and said mobile electrode for normally maintaining said specified distance therebetween.

8. A method of measuring the speed of a vehicle traveling on rotating wheels, said method comprising the steps of:
    attaching a speed sensor on one of said wheels, said speed sensor including a stationary electrode, a mobile electrode and elastic means for supporting said mobile electrode normally at a specified distance from said stationary electrode;
    measuring a centrifugal force on said mobile electrode from a displacement of said mobile electrode with respect to said stationary electrode as said one wheel rotates; and
    calculating the speed of said vehicle from said measured centrifugal force.

* * * * *